US012727536B2

(12) United States Patent
Vandike et al.

(10) Patent No.: US 12,727,536 B2
(45) Date of Patent: Sep. 8, 2026

(54) AGRICULTURAL RESIDUE DISTRIBUTION CONTROL SYSTEM AND METHOD

(71) Applicant: Deere & Company, Moline, IL (US)

(72) Inventors: Nathan R. Vandike, Geneseo, IL (US); Noel W. Anderson, Fargo, ND (US); Mahesh Somarowthu, Pune (IN)

(73) Assignee: DEERE & COMPANY, Moline, IL (US)

( * ) Notice: Subject to any disclaimer, the term of this patent is extended or adjusted under 35 U.S.C. 154(b) by 293 days.

(21) Appl. No.: 18/460,898

(22) Filed: Sep. 5, 2023

(65) Prior Publication Data

US 2025/0072324 A1 Mar. 6, 2025

(51) Int. Cl.
*A01D 41/127* (2006.01)
*A01D 41/12* (2006.01)

(52) U.S. Cl.
CPC ....... *A01D 41/127* (2013.01); *A01D 41/1243* (2013.01)

(58) Field of Classification Search
CPC .......................... A01D 41/127; A01D 41/1243
See application file for complete search history.

(56) References Cited

U.S. PATENT DOCUMENTS 6,119,442 A 9/2000 Hale
6,406,368 B1 6/2002 Cruson et al.
6,591,145 B1 7/2003 Hoskinson et al.
6,939,221 B1 9/2005 Redekop et al.
7,110,881 B2 9/2006 Gray et al.
7,354,341 B1 4/2008 Smith et al.
7,409,743 B2 8/2008 Di Anna
7,485,035 B1 2/2009 Yde
(Continued)

FOREIGN PATENT DOCUMENTS

AU 2018203052 A1 11/2019
BR 102021011031 A2 1/2022
(Continued)

OTHER PUBLICATIONS

Non-Final Office Action issued in Utility U.S. Appl. No. 18/175,187 dated Oct. 23, 2024.
(Continued)

*Primary Examiner* — Zhipeng Wang
(74) *Attorney, Agent, or Firm* — KLINTWORTH & ROZENBLAT LLP

(57) ABSTRACT

An agricultural residue distribution control system associated with an agricultural work vehicle includes one or more sensors configured to collect information of an initial state at a field location including an amount of biomass at the field location, soil characteristics at the field location, or both, during the initial state; and a controller. The controller is configured to: receive the information collected from the one or more sensors of the biomass, the soil characteristics, or both, at the field location during the initial state; acquire a target future state at the field location; generate a residue distribution plan for the target future state at the field location based on the received information collected from the one or more sensors of the amount of biomass, the soil characteristics, or both, at the field location during the initial state; and execute the residue distribution plan to achieve the target future state.

18 Claims, 3 Drawing Sheets

(56) References Cited

U.S. PATENT DOCUMENTS 8,056,313 B1 11/2011 Flora et al.
8,191,346 B2 6/2012 Flora et al.
8,347,595 B1 1/2013 Flora et al.
9,043,129 B2 5/2015 Bonefas et al.
9,795,913 B1 10/2017 Flora et al.
10,126,282 B2 11/2018 Anderson et al.
10,244,675 B2 4/2019 LaRowe
10,909,368 B2 2/2021 Guo et al.
11,140,807 B2 10/2021 Pfeiffer et al.
11,240,959 B2 2/2022 Borgstadt
11,246,264 B2 2/2022 Groves
11,533,862 B2 12/2022 Gillberg et al.
12,062,159 B1 8/2024 Kanagaraj
2002/0072400 A1 6/2002 Foth
2003/0088321 A1 5/2003 Creger et al.
2003/0190939 A1 10/2003 Bueermann
2003/0199291 A1 10/2003 Bernhardt et al.
2005/0026662 A1 2/2005 Fechner et al.
2005/0059445 A1 3/2005 Niermann et al.
2005/0194473 A1 9/2005 Pearson et al.
2005/0245300 A1 11/2005 Maertens et al.
2006/0183519 A1 8/2006 Benes
2006/0246966 A1 11/2006 Smith
2007/0026912 A1 2/2007 Anderson et al.
2007/0111766 A1 5/2007 Holmen
2007/0209423 A1 9/2007 Missotten et al.
2007/0233416 A1 10/2007 Jeppe
2007/0275775 A1 11/2007 Farley et al.
2008/0209878 A1 9/2008 Farley
2008/0268927 A1 10/2008 Farley et al.
2008/0318648 A1 12/2008 Baumgarten et al.
2009/0005137 A1 1/2009 Isaac et al.
2009/0036184 A1 2/2009 Craessaerts et al.
2009/0069986 A1 3/2009 Covington et al.
2009/0111548 A1 4/2009 Landuyt
2009/0253474 A1 10/2009 Isaac
2009/0287380 A1 11/2009 Chervenka et al.
2009/0313962 A1 12/2009 Talbi
2009/0325659 A1 12/2009 Overschelde et al.
2011/0045883 A1 2/2011 Weichholdt et al.
2011/0045884 A1 2/2011 Weichholdt et al.
2011/0093169 A1 4/2011 Schroeder et al.
2011/0130180 A1 6/2011 Van Brabant et al.
2011/0130181 A1 6/2011 Roberge et al.
2011/0237316 A1 9/2011 Isaac et al.
2011/0270495 A1* 11/2011 Knapp ................ A01D 41/127 701/50
2011/0295423 A1 12/2011 Anderson
2011/0320087 A1 12/2011 Farley et al.
2012/0178509 A1 7/2012 Eggenhaus et al.
2012/0199649 A1 8/2012 Wishnatzki et al.
2012/0270613 A1 10/2012 Isaac et al.
2013/0095899 A1 4/2013 Knapp
2013/0324199 A1 12/2013 Roberge et al.
2014/0031096 A1 1/2014 Isaac et al.
2014/0050364 A1 2/2014 Brueckner et al.
2014/0053524 A1 2/2014 Werning
2014/0080555 A1 3/2014 Wagner et al.
2014/0171160 A1 6/2014 Ricketts et al.
2014/0208851 A1 7/2014 Bischoff
2014/0302897 A1 10/2014 Isaac et al.
2015/0009328 A1 1/2015 Escher et al.
2015/0080069 A1 3/2015 Fuchs et al.
2015/0080070 A1 3/2015 Johnson et al.
2015/0089912 A1 4/2015 Patton et al.
2015/0264864 A1 9/2015 Branch et al.
2015/0348419 A1 12/2015 Matthews
2015/0351321 A1 12/2015 Shane
2015/0373913 A1 12/2015 Berry et al.
2016/0025531 A1 1/2016 Bischoff et al.
2016/0088794 A1 3/2016 Baumgarten et al.
2016/0113199 A1 4/2016 Jongmans et al.
2016/0189007 A1 6/2016 Wellington et al.
2016/0235003 A1 8/2016 Baumgarten et al.
2016/0286721 A1 10/2016 Heitmann et al.
2016/0286722 A1 10/2016 Heitmann et al.
2016/0327535 A1 11/2016 Cotton et al.
2016/0374267 A1 12/2016 Reinecke et al.
2017/0032473 A1 2/2017 Koch et al.
2017/0034997 A1 2/2017 Mayerle
2017/0055444 A1 3/2017 Mahieu et al.
2017/0055445 A1 3/2017 Mahieu et al.
2017/0071125 A1 3/2017 Pfeiffer et al.
2017/0086372 A1 3/2017 Palla et al.
2017/0086373 A1 3/2017 Mahieu et al.
2017/0094901 A1 4/2017 French et al.
2017/0112055 A1 4/2017 Depreitere et al.
2017/0112061 A1 4/2017 Meyer
2017/0115862 A1 4/2017 Stratton et al.
2017/0142900 A1 5/2017 Mahieu et al.
2017/0215330 A1 8/2017 Missotten et al.
2017/0231156 A1 8/2017 Aesaert et al.
2017/0238463 A1 8/2017 Van De Wege et al.
2017/0251601 A1 9/2017 Dugas et al.
2017/0273240 A1 9/2017 Quincke
2017/0303465 A1 10/2017 Koch et al.
2018/0000011 A1 1/2018 Schleusner et al.
2018/0007831 A1 1/2018 Ballegeer et al.
2018/0047177 A1 2/2018 Obropta et al.
2018/0049369 A1 2/2018 Secrest et al.
2018/0053067 A1 2/2018 Walker
2018/0084718 A1 3/2018 Baumgarten et al.
2018/0092301 A1 4/2018 Vandike et al.
2018/0092302 A1 4/2018 Vandike et al.
2018/0116112 A1 5/2018 French, Jr.
2018/0272963 A1 9/2018 Meyhofer et al.
2018/0303030 A1 10/2018 Heitmann et al.
2018/0310474 A1 11/2018 Posselius et al.
2018/0359919 A1 12/2018 Blank et al.
2018/0368318 A1 12/2018 Isaac et al.
2019/0008091 A1 1/2019 Isaac et al.
2019/0050948 A1 2/2019 Patrick et al.
2019/0059222 A1 2/2019 Kelber
2019/0059232 A1 2/2019 Ricketts
2019/0090421 A1 3/2019 Bollin et al.
2019/0104681 A1 4/2019 Larson et al.
2019/0133037 A1 5/2019 Todd et al.
2019/0141893 A1 5/2019 Vandike et al.
2019/0174674 A1 6/2019 Diessner et al.
2019/0254227 A1 8/2019 Roberge
2019/0261560 A1 8/2019 Jelenkovic
2019/0335659 A1 11/2019 Kringe et al.
2019/0350132 A1 11/2019 Issac et al.
2019/0392573 A1* 12/2019 Ferrari .................. G06F 18/217
2020/0015416 A1 1/2020 Barther et al.
2020/0029498 A1 1/2020 Vandike et al.
2020/0029499 A1 1/2020 Scherman et al.
2020/0060082 A1 2/2020 Shinners et al.
2020/0077591 A1 3/2020 Xu et al.
2020/0084967 A1 3/2020 Corban et al.
2020/0100427 A1 4/2020 Beavers et al.
2020/0107502 A1 4/2020 Mayerle et al.
2020/0113113 A1* 4/2020 Shearer ................ A01B 49/027
2020/0120869 A1 4/2020 Vandike et al.
2020/0281118 A1 9/2020 Garrett
2020/0296896 A1 9/2020 Mayerle
2020/0323133 A1 10/2020 Anderson et al.
2020/0375083 A1 12/2020 Anderson et al.
2020/0396904 A1 12/2020 Faulkner et al.
2020/0402184 A1 12/2020 Dasgupta et al.
2021/0015039 A1 1/2021 Vandike et al.
2021/0015045 A1 1/2021 Vandike et al.
2021/0022289 A1 1/2021 Berry
2021/0034867 A1 2/2021 Ferrari et al.
2021/0127573 A1 5/2021 Mahieu et al.
2021/0144917 A1 5/2021 Gurke et al.
2021/0195839 A1 7/2021 Koch et al.
2021/0264252 A1 8/2021 Davis
2021/0272255 A1 9/2021 Barrick et al.
2021/0282329 A1 9/2021 Hall
2021/0321554 A1 10/2021 Liu et al.
2021/0368686 A1 12/2021 Wisdom et al.
2021/0400870 A1 12/2021 Sunil et al.
2022/0067906 A1 3/2022 Hadar

(56) References Cited

U.S. PATENT DOCUMENTS

| | | | | |
|---|---|---|---|---|
| 2022/0110238 | A1 | 4/2022 | Vandike et al. | |
| 2022/0110253 | A1 | 4/2022 | Anderson et al. | |
| 2022/0132742 | A1 | 5/2022 | Faulkner et al. | |
| 2022/0138987 | A1 | 5/2022 | Anderson et al. | |
| 2022/0174873 | A1 | 6/2022 | Topmöller et al. | |
| 2022/0230294 | A1 | 7/2022 | Hadar | |
| 2022/0232768 | A1 | 7/2022 | Craig | |
| 2022/0309262 | A1 | 9/2022 | Herbers | |
| 2022/0346313 | A1 | 11/2022 | Passchyn et al. | |
| 2022/0350989 | A1 | 11/2022 | Warwick et al. | |
| 2022/0354054 | A1 | 11/2022 | Hermann | |
| 2022/0361411 | A1 | 11/2022 | Mayerle et al. | |
| 2022/0361412 | A1 | 11/2022 | Duquesne et al. | |
| 2022/0369552 | A1 | 11/2022 | Christiansen et al. | |
| 2022/0369553 | A1 | 11/2022 | Christiansen et al. | |
| 2022/0369554 | A1 | 11/2022 | Christiansen et al. | |
| 2022/0375228 | A1 | 11/2022 | Christiansen et al. | |
| 2022/0394921 | A1 | 12/2022 | Missotten et al. | |
| 2022/0394923 | A1 | 12/2022 | Christiansen et al. | |
| 2022/0394924 | A1 | 12/2022 | Christiansen et al. | |
| 2022/0394925 | A1 | 12/2022 | Missotten et al. | |
| 2022/0397417 | A1 | 12/2022 | Christiansen et al. | |
| 2022/0408642 | A1 | 12/2022 | Mygind Bojsen | |
| 2023/0026898 | A1 | 1/2023 | Baes et al. | |
| 2023/0028281 | A1 | 1/2023 | Lorriette | |
| 2023/0037095 | A1 | 2/2023 | Mayerle | |
| 2023/0050661 | A1* | 2/2023 | Schmidt | G06V 20/56 |
| 2023/0225246 | A1 | 7/2023 | Leenknegt et al. | |
| 2024/0057505 | A1 | 2/2024 | Liu et al. | |
| 2024/0284826 | A1 | 8/2024 | Meyers et al. | |
| 2025/0072311 | A1* | 3/2025 | Schroeder | A01B 63/24 |

FOREIGN PATENT DOCUMENTS

| | | | |
|---|---|---|---|
| BR | 102021011709 | A2 | 12/2022 |
| CN | 1748451 | A | 3/2006 |
| CN | 2770312 | Y | 4/2006 |
| CN | 101611670 | A | 12/2009 |
| CN | 101743804 | A | 6/2010 |
| CN | 201536492 | U | 8/2010 |
| CN | 201657632 | U | 12/2010 |
| CN | 102090207 | A | 6/2011 |
| CN | 102138383 | A | 8/2011 |
| CN | 102396322 | A | 4/2012 |
| CN | 102812825 | A | 12/2012 |
| CN | 103141214 | A | 6/2013 |
| CN | 103196777 | A | 7/2013 |
| CN | 103404299 | A | 11/2013 |
| CN | 203661659 | U | 6/2014 |
| CN | 204202641 | U | 3/2015 |
| CN | 204305637 | U | 5/2015 |
| CN | 204518489 | U | 8/2015 |
| CN | 106706177 | A | 5/2017 |
| CN | 107123115 | A | 9/2017 |
| CN | 108093830 | A | 6/2018 |
| CN | 108107049 | A | 6/2018 |
| CN | 108370712 | A | 8/2018 |
| CN | 108593155 | A | 9/2018 |
| CN | 208159295 | U | 11/2018 |
| CN | 108934416 | A | 12/2018 |
| CN | 109041759 | A | 12/2018 |
| CN | 208191337 | U | 12/2018 |
| CN | 109548472 | A | 4/2019 |
| CN | 109566064 | A | 4/2019 |
| CN | 110381727 | A | 10/2019 |
| CN | 110583217 | A | 12/2019 |
| CN | 110622684 | A | 12/2019 |
| CN | 209861615 | U | 12/2019 |
| CN | 112577766 | A | 3/2021 |
| DE | 20104694 | U1 | 6/2001 |
| DE | 10062114 | A1 | 9/2002 |
| DE | 102014005904 | A1 | 10/2015 |
| DE | 102014014049 | A1 | 3/2016 |
| DE | 102015224175 | B3 | 4/2017 |
| DE | 102020118160 | A1 | 1/2021 |
| EP | 0264764 | A2 | 4/1988 |
| EP | 0586999 | A2 | 3/1994 |
| EP | 0685151 | B1 | 12/1995 |
| EP | 1266553 | B1 | 12/2002 |
| EP | 1736044 | B1 | 9/2008 |
| EP | 1964465 | B1 | 9/2008 |
| EP | 1790207 | B1 | 11/2009 |
| EP | 1856966 | B1 | 11/2009 |
| EP | 2364587 | B1 | 9/2011 |
| EP | 1900272 | B1 | 12/2011 |
| EP | 2561746 | B1 | 12/2014 |
| EP | 2936962 | B1 | 8/2017 |
| EP | 3205201 | A1 | 8/2017 |
| EP | 2936961 | B1 | 8/2018 |
| EP | 3205201 | B1 | 8/2018 |
| EP | 3172959 | B1 | 9/2018 |
| EP | 3228174 | B1 | 3/2019 |
| EP | 3000302 | B1 | 8/2019 |
| EP | 3613272 | A1 | 2/2020 |
| EP | 3845050 | A1 | 7/2021 |
| EP | 3879363 | A1 | 9/2021 |
| EP | 4000373 | A1 | 5/2022 |
| EP | 4091422 | A1 | 11/2022 |
| EP | 4091423 | A1 | 11/2022 |
| EP | 4091424 | A1 | 11/2022 |
| EP | 4094564 | A1 | 11/2022 |
| EP | 4101282 | A1 | 12/2022 |
| EP | 4101283 | A1 | 12/2022 |
| EP | 4104665 | A1 | 12/2022 |
| EP | 4115723 | A1 | 1/2023 |
| EP | 4129044 | A1 | 2/2023 |
| GB | 2182284 | A | 5/1987 |
| GB | 2387098 | A | 10/2003 |
| GB | 202108227 | | 7/2021 |
| GB | 2606740 | A | 11/2022 |
| GB | 2606741 | A | 11/2022 |
| IN | 202011006479 | A | 8/2021 |
| JP | 2005102610 | A | 4/2005 |
| JP | 2012200171 | A | 10/2012 |
| JP | 2012244942 | A | 12/2012 |
| JP | 2014117242 | A | 6/2014 |
| JP | 2015023807 | A | 2/2015 |
| JP | 2015097487 | A | 5/2015 |
| JP | 2017176061 | A | 10/2017 |
| PL | 397262 | A1 | 6/2013 |
| PL | 219431 | B1 | 4/2015 |
| RU | 76771 | U1 | 10/2008 |
| RU | 2453101 | C1 | 6/2012 |
| RU | 171483 | U1 | 6/2017 |
| RU | 2677189 | C2 | 1/2019 |
| RU | 187590 | U1 | 3/2019 |
| RU | 188022 | U1 | 3/2019 |
| WO | WO2003005803 | A1 | 1/2003 |
| WO | WO2003039238 | A1 | 5/2003 |
| WO | WO2008126013 | A2 | 10/2008 |
| WO | WO2014030511 | A1 | 2/2014 |
| WO | WO2017075002 | A1 | 5/2017 |
| WO | WO2017170633 | A1 | 10/2017 |
| WO | WO2018076428 | A1 | 5/2018 |
| WO | WO2018162699 | A1 | 9/2018 |
| WO | WO2019067906 | A2 | 4/2019 |
| WO | WO2019210388 | A1 | 11/2019 |
| WO | WO2022243785 | A1 | 11/2022 |
| WO | WO2022243786 | A1 | 11/2022 |
| WO | WO2023043781 | A1 | 3/2023 |
| WO | WO2023187494 | A1 | 10/2023 |

OTHER PUBLICATIONS

AQES Webpage: Aerosol Related Research, "Remote Sensing of Dust Plume from Movement of Tracked Vehicles", by Mark J. Rood, Ivan Racheff Professor of Environmental Engineering, retrieved on Nov. 19, 2019; retrieved from the Internet: URL: http://aqes.cee.illinois.edu/research%20areas/lidar/trackedvehicles/trackedvehicles.htm.

Alvarado, Miguel et al., "Towards The Development of a Low Cost Airborne Sensing System to Monitor Dust Particles after Blasting at Open-Pit Mine Sites". Sensors (Basel). Aug. 2015; 15(8): 19667-

(56) References Cited

OTHER PUBLICATIONS

19687. Accessed Jan. 31, 2018 5:30 PM CST from https://www.ncbi.nlm.nih.gov/pmc/articles/PMC4570391/.
Kovar, Margaret, "Dust Emission Research May Lead to Reduction of Air Pollutants". New Mexico State University, Mar. 16, 2009, Accessed Jan. 31, 2018 from http://newscenter.nmsu.edu/Articles/view/4441.
Meyer, Thomas H., "A Dynamic Lagrangian, Field-scale Model of Dust Dispersion from Agricultural Tilling Operations", Jan. 1, 2008, Accessed Jan. 31, 2018 4:45 Pm Cst from http://opencommons.uconn.edu/cgi/viewcontent.cgi?article=1009&context=nrme_articles.
"Grain Handling Operations and Dust Control" accesed Feb. 9, 2018 3:45 PM from https://www.illinois.gov/dceo/SmallBizAssistance/EnvironmentalAssistanceProgram/Documents/grain%20handling%20operations%20dust%20control.pdf.
Video focusing on Minimizing Almond Harvest Dust accessed Feb. 9, 2018 3:50 PM from http://www.growingproduce.com/nuts/videos-focus-on-minimizing-almond-harvest-dust/.
Video of Exact Almond Harvester with Patented Eco-Clean System to Minimize Dust (reduction up to 75%) at harvest accessed Feb. 9, 2018 at 4:00 PM https://www.youtube.com/watch?time_continue=105&v=-pLu0TPEC9k.
Video of New Technology & Incentives to Reduce Dust at Harvest, CaliforniaAgNet, https://www.youtube.com/watch?v=9PoPUoTQEKQ, 2016.
Thelen, Marilyn, "Only You Can Prevent Combine Fires MSU Extension", Oct. 7, 2016; http://msue.anr.msu.edu/news/only_you_can_prevent_combine_fires.
Williams, Jack, "Many Midwest Farmers Wary of Changes to NAFTA", Published on Apr. 3, 2017 at 11.56 am CDT; http://harvestpublicmedia.org/post/watch-many-midwest-farmers-wary-changes-nafta.
The Farmers Wife: Wheat Harvest, Tuesday Jul. 26, 2011; http://thefarmersbetterhalf.blogspot.com/2011/07/wheat-harvest.html?_sm_au_=iVV27JvvnH2B27ST.
Wallpaper HD of sunlight, sky, field, clouds, yellow, flying, farm, dust, grain, machine, dusk, Working, wheat, etc., taken with an unknown camera Oct. 31, 2017; https://wallhere.com/en/wallpaper/881188.
Harvest . . . Hot Rods . . . Horses . . . One Hot Time in Juniper Canyon, by Hot Rod Cowgirl dated Aug. 12, 2011; https://hotrodcowgirl.com/2011/08/12/hot-time-summer-in-the-city-juniper-canyon-2011/.
Custom Harvest Insurance, Ltd., Brochure, 601 S. 5th St., Ste. B Manhattan, KS 66502; http://www.charvest.com/, Copyright 2023.
Dust Control—Santa Barbara County Air Pollution Control District; https://www.ourair.org/dust-control/, Copyright 2023.
Common, Casey, "Snow Emergencies Declared in Minneapolis, St. Paul", Jan. 18, 2014-4:55PM; http://www.startribune.com/snow-emergencies-declared-in-minneapolis-st-paul/241006981/.
Ono, Duane, "Wind Blown Dust Monitoring and Modeling at Owens Lake, CA", Jul. 2004, WRAP Dust Emissions Joint Forum Meeting, Reno, Nevada; https://slideplayer.com/slide/6388678/.
Barnes, David L., "Managing Dust on Unpaved Roads and Airports", Oct. 2014; https://www.researchgate.net/publication/267866793_Managing_Dust_on_Unpaved_Roads_and_Airports?_sg=TSMI6swtvie8iNP6Mm3YLLmuJ2TP9EEfO3nyQT5KM31_1VdkQWKJoeyif5Lh8iXf1hjHrle_sA.
Kok J F, Parteli E Jr, Michaels T I and Bou Karam D 2012 The Physics of Windblown Sand and Dust, Rep. Prog. Phys. 75 106901. Accessed Feb. 9, 2018 2:20 PM CST from https://arxiv.org/ftp/arxiv/papers/1201/1201.4353.pdf.
Dust Diverter | Combine Accessories Made In USA | WA Johnson Inc.; W.A. Johnson Dust Diverter John Deere S Series Combine, [Internet Archive Wayback Machine first available date, Jan. 17, 2022, from: https://www.wajohnson.com/-dust-diverter.html.].
Dust Diverters—Copyright © 2023 GVL Polymers, Inc.,; https://gvlpoly.com/agri-poly/dust-diverters/.
Welcome to Agtalk; Anyone Using the Add on Dust Control Devices for Headers?—Sep. 19 2007, https://talk.newagtalk.com/forums/thread-view.asp?tid=30144&DisplayType=nested&setCookie=1.
Exact, An Exciting New Standard in Low Dust Nut Harvesting-Exact Harvesting system; http://exactcorp.com/products/harvesters/, © 2015 Exact Corporation.
New Innovations to Reduce Dust in Almond Orchards, by Dennis Pollock, Contributing Writer | Nov. 17, 2016; http://www.westernfarmpress.com/tree-nuts/new-innovations-reduce-dust-almond-orchards.
Large Scale Industrial Odour & Dust Suppression, MistCannon, pp. 6. [online]: retrieved on Nov. 19, 2019; retrieved from the Internet: URL: https://www.environmental-expert.com/products/mistcannon-outdoor-dust-suppression-equipment-440299.
North Dakota Geological Survey by Lynn D. Helms: retrieved on May 5, 2022; retrieved from the internet: https://www.dmr.nd.gov/ndgs/.
Impacts of Biofilms on the Conversion of Cellulose, by Simone Brethauer, Published online: Apr. 26, 2020; (PDF) (researchgate.net).
IJMS | Free Full-Text | Impact of Cell Wall Composition on Maize Resistance to Pests and Diseases | HTML (mdpi.com), by Rogelio Santiago Copyright 1996-2023 MDPI.
Structure of Lignocellulosic Biomass and Its Biopolymers; Cellulose, . . . | Download Scientific Diagram (researchgate.net) Published Mar. 20, 2021.
Chemical and Structural Characterization of Maize Stover Fractions in Aspect of Its Possible Applications—PMC (nih.gov), 2021.
"Composting and Formation of Humic Substances" by R B Harrison in Encyclopedia of Ecology, 2008. Lignin Decomposition—an overview | ScienceDirect Topics.
Cellulose Decomposition; Microbial Decomposition of Cellulose in Soil—Online Biology Notes, 2023.
"Processes of Crop Residue Breakdown", Kruger Seeds. Aug. 15, 2018. Accessed Jun. 8, 2022 10:00 AM from Processes of Crop Residue Breakdown (krugerseed.com).
"Corn Residue Breakdown as Affected by Tillage and N Application", Iowa State University Extension. Nov. 5, 2019. Accessed Jun. 8, 2022 9:30 AM CDT from Corn Residue Breakdown as Affected by Tillage and N Application Integrated Crop Management (iastate.edu).
NMR Characterization of Lignans—PMC (nih.gov) Types and Subtypes of Lignans from "NMR Characterization of Lignans" by Roberto Consonni and Gianluca Ottoline, Molecules, Apr. 2022, 27(7).
[Terahertz and Infrared Spectroscopic Investigation of Cellulose]—PubMed (nih.gov) "Terahertz and Infrared Spectroscopic Investigation of Cellulose" [English abstract, article is in Chinese] by Guo-hau Qiu, Le Zhang, and Nan-ying Shentu. Mar. 2016.
"Terahertz Spectroscopy and Imaging: A review on Agricultural Applications" by Leili Afsah-Hejri et al. Computers and Electronics in Agriculture vol. 177, Oct. 2020, 105628. https://www.sciencedirect.com/science/article/abs/pii/S0168169919318204.
Corn Residue Field Days Oct. 20, 28 | Institute of Agriculture and Natural Resources—CropWatch | University of Nebraska-Lincoln (unl.edu), Peta-Gaye Clachar—Communications Specialist, Oct. 4, 2016.
Chemical and Structural Characterization of Maize Stover Fractions in Aspect of Its Possible Applications—PMC (nih.gov), Cédric Delattre, Academic Editor, https://www.ncbi.nlm.nih.gov/pmc/articles/PMC8004008/ Mar. 2021.
Dry or Senescent Carbon (13harrisgeospatial.com), © 2023 NV5 Geospatial | Legal, https://www.13harrisgeospatial.com/docs/DrySenescentCarbon.html#:~:text=The dry or senescent carbon, cell walls in plant tissues.
(Data Management | John Deere HarvestLab™ 3000 and Constituent Sensing | John Deere US Jun. 13, 2022 9:00 AM CDT).
"Using NDF and ADF to Balance Diets", Belyea et al., University of Missouri Extension. Using NDF and ADF to Balance Diets | MU Extension (missouri.edu), Department of Animal Sciences, © 1993 to 2023.

(56) References Cited

OTHER PUBLICATIONS

"Determination of Cellulose, NDF, ADF, and Lignan Content Using Non-Destructive Method (FT-NIR Spectrometry) in Hay from Apuseni Mountains", Laura Dale et al. (Abstract only) (PDF) Determination of Cellulose, NDF, ADF and Lignin Content Using Non-Destructive Method (FT-NIR Spectrometry) in Hay from Apuseni Mountains (researchgate.net). Oct. 2011.
Sciencedirect, "Crop-Residue Management", D.C. Reicosky et al., Encyclopedia of Soils in the Environment, 2005, https://www.sciencedirect.com/topics/earth-and-planetary-sciences/cropresidue.
European Search Report issued in counterpart European Application No. 20184744.9 dated Dec. 15, 2020 (08 pages).
Utility U.S. Appl. No. 18/175,187, filed Feb. 27, 2023.
Utility U.S. Appl. No. 18/299,946, filed Apr. 13, 2023.
Utility U.S. Appl. No. 18/311,479, filed May 3, 2023.
Non-Final Office Action issued in Utility U.S. Appl. No. 18/299,946 dated Sep. 2, 2025.
Non-Final Office Action issued in Utility U.S. Appl. No. 18/311,479 dated Oct. 22, 2025.
Final Office Action issued in Utility U.S. Appl. No. 18/299,946 dated Feb. 20, 2026.
Non-Final Office Action issued in U.S. Appl. No. 19/192,073 dated May 4, 2026.

* cited by examiner

AGRICULTURAL RESIDUE DISTRIBUTION CONTROL SYSTEM AND METHOD

STATEMENT OF FEDERALLY SPONSORED RESEARCH OR DEVELOPMENT

Not applicable.

FIELD OF THE DISCLOSURE

This disclosure generally relates to work vehicles, and more specifically to systems and methods for harvesters and other types of agricultural work vehicles.

BACKGROUND OF THE DISCLOSURE

There are a wide variety of different types of agricultural machines, forestry machines, and/or construction machines. As examples, some agricultural machines include harvesters, such as combine harvesters, sugar cane harvesters, cotton harvesters, self-propelled forage harvesters, and windrowers. Harvest operations may involve various types of systems and management mechanisms in order to improve overall performance and production, including mechanisms for dealing with crop residue, such as straw, chaff, weeds, and the like, resulting from threshing and/or separation processes on the harvester.

SUMMARY OF THE DISCLOSURE

The disclosure provides work vehicle residue distribution control systems and methods.

An agricultural residue distribution control system associated with an agricultural work vehicle includes one or more sensors configured to collect information of an initial state at a field location including an amount of biomass at the field location, soil characteristics at the field location, or both, during the initial state; and a controller having a processor and memory architecture coupled to the one or more sensors. The controller is configured to: receive the information collected from the one or more sensors of the biomass, the soil characteristics, or both, at the field location during the initial state; acquire a target future state at the field location; generate a residue distribution plan for the target future state at the field location based on the received information collected from the one or more sensors of the amount of biomass, the soil characteristics, or both, at the field location during the initial state; and execute the residue distribution plan to achieve the target future state.

In an example of the control system, the one or more sensors are positioned on the agricultural work vehicle.

In an example of the control system, the one or more sensors are further configured to collect information associated with one or more of mass, weight, volume, size, moisture, or molecule type of residue being processed by the agricultural work vehicle as residue information, and the controller is further configured to generate the residue distribution additionally based on the residue information.

In an example of the control system, the one or more sensors are further configured to collect information associated with one or more of a statistical distribution of residue size or a statistical distribution of residue constituents being processed by the agricultural work vehicle as residue information, and the controller is further configured to generate the residue distribution additionally based on the residue information.

In an example of the control system, the controller is configured to, prior to generating the residue distribution plan, analyze the information collected from the one or more sensors with one or more of residue image analysis, remote sensed image analysis, or residue spectroscopy analysis.

In an example of the control system, the controller is configured to generate the residue distribution plan additionally based on environmental information.

In an example of the control system, the controller is configured to, during the generating the residue distribution plan, account for a latency between processing of crop and distribution of the residue.

In an example of the control system, the system further includes a display interface coupled to the controller, and the controller is configured to display information associated with the residue distribution plan on the display interface.

In an example of the control system, the system further includes one or more residue actuators coupled to the controller, and the controller is configured to generate commands for the one or more residue actuators to execute the residue distribution plan.

In an example of the control system, the one or more residue actuators include at least one of a residue mixer, a residue inoculator, a residue chopper, or a residue spreader.

In an example of the control system, the target future state defines one or more of a surface residue coverage at a future point in time, a change in total soil organic matter or soil carbon, a change in a type of soil carbon, a distribution of the residue directly or inversely proportional to the amount of biomass from a previous state, or a change to a bound nitrogen curve for a future growing state.

In a further aspect, a method is provided for controlling residue distribution of an agricultural work vehicle. The method includes: collecting, with one or more sensors, information of an initial state at a field location including an amount of biomass at the field location, soil characteristics at the field location, or both, during the initial state; determining, with a controller, a target future state at the field location; and generating, with the controller, a residue distribution plan for the target future state at the field location based on the received information collected from the one or more sensors of the amount of biomass, the soil characteristics, or both, at the field location during the initial state.

In an example of the method, the one or more sensors are positioned on the agricultural work vehicle.

In an example of the method, the collecting, with the one or more sensors, includes collecting information of the initial state with information that further includes one or more of mass, weight, volume, size, moisture, or molecule type of residue being processed by the agricultural work vehicle as residue information, and the generating, with the controller, the residue distribution plan includes generating the residue distribution plan with the residue information.

In an example of the method, the residue information is determined with one or more of residue image analysis, remote sensed image analysis, or residue spectroscopy analysis.

In an example of the method, the generating the residue distribution plan includes generating the residue distribution plan additionally based on environmental information.

In an example of the method, the method further includes displaying, on a display interface, information associated with the residue distribution plan.

In an example of the method, the method further includes executing, with one or more residue actuators, the residue distribution plan.

In an example of the method, the one or more residue actuators include at least one of a residue mixer, a residue inoculator, a residue chopper, or a residue spreader.

In an example of the method, the determining the residue target future state includes determining the residue target future state that defines one or more of a surface residue coverage at a future point in time, a change in total soil organic matter or soil carbon, a change in a type of soil carbon, a distribution of the residue directly or inversely proportional to an amount of biomass from a previous state, or a change to a bound nitrogen curve for a future growing state.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
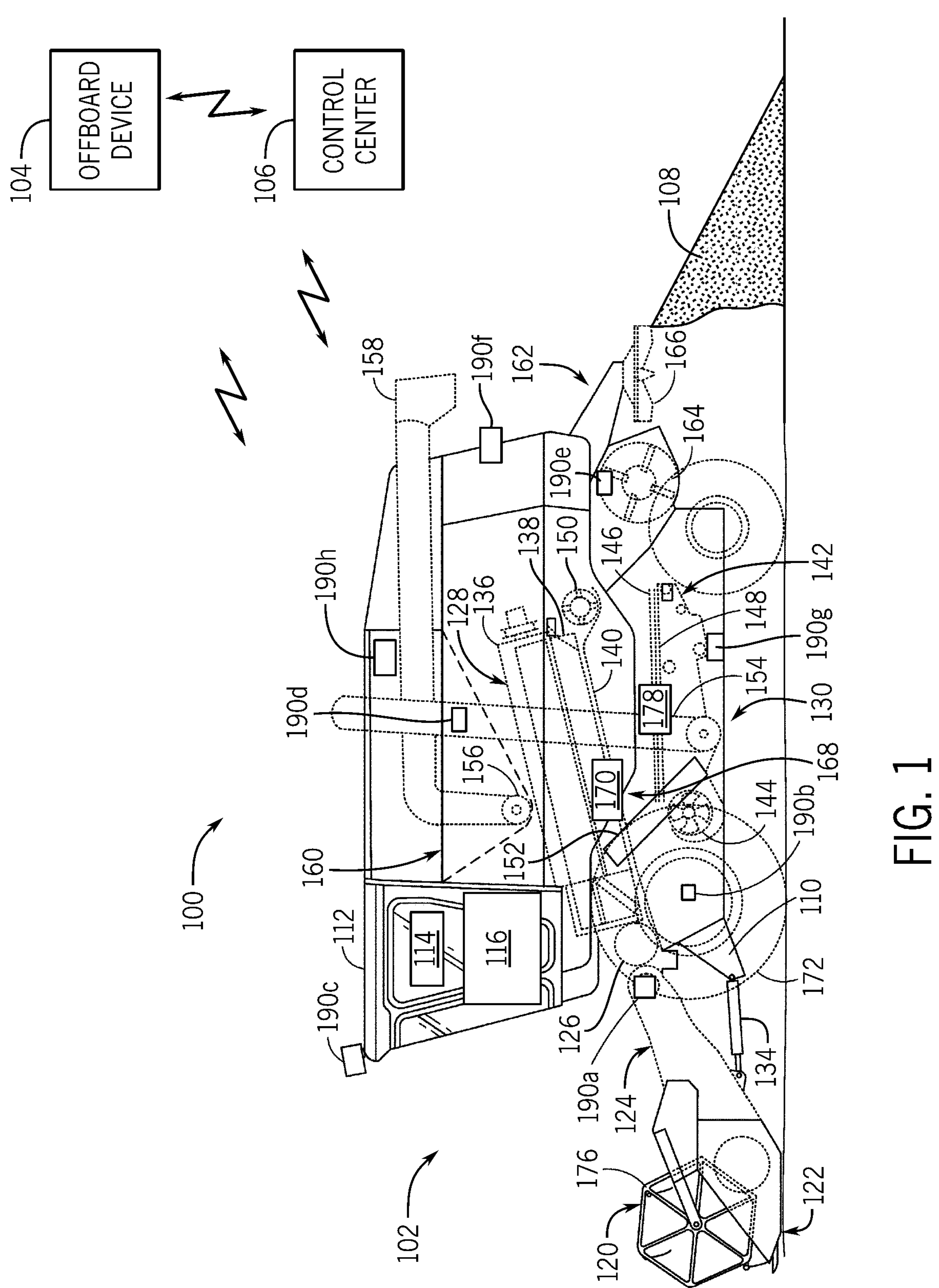
FIG. 1 is a partial pictorial, partial schematic representation of a residue distribution control system that may be implemented with an agricultural harvester in accordance with an example embodiment.

The following describes one or more example embodiments of the disclosed agricultural system and method, particularly a work vehicle residue distribution control system and method as shown in the accompanying figures of the drawings described briefly above. Various modifications to the example embodiments may be contemplated by one of skill in the art. Discussion herein may sometimes focus on the example application in an agricultural harvester, but the disclosed system and method are applicable to other types of work vehicles and/or other types of work environments.

As noted, there are a wide variety of different types of agricultural machines, including harvesters, such as combine harvesters, sugar cane harvesters, cotton harvesters, self-propelled forage harvesters, and windrowers, as well as other types of agricultural work vehicles, such as manure spreaders, fertilizer applicators, planters and sprayers. Agricultural operations may involve various types of systems and management mechanisms in order to improve overall performance and production.

Broadly, an agricultural harvester travels through a field harvesting a crop. In one common arrangement, agricultural harvesting heads extend forward from the frame of the agricultural harvester to engage the plant stalks, sever them, and carry the severed crop into the body of the agricultural harvester itself for further processing. Threshing, cleaning and separating mechanisms inside the agricultural harvester are provided to separate grain from material other than grain (e.g., to result in "crop residue"). Once separated, the crop residue is carried to the rear of the combine, chopped, and spread over the ground. As used herein, the term "biomass" may include the crop residue on the field as well as additional vegetative or organic material in addition to separated crop material, such as standing crop, cut crop, crop remnants from previous operations, manure, and weed material.

Operators generally consider residue during agricultural operation for a number of reasons. For example, crop residue may impact erosion or top soil retention. In particular, residue may function as a natural mulch, covering the soil and protecting it from erosion by wind and water, thereby preventing soil loss. Crop residue may also increase organic matter content in the soil, which helps to improve soil structure and moisture properties by making the soil more resistant to erosion and better able to hold onto water during dry periods. Additionally, carbon sequestration is another benefit of residue management by fixing plant carbon within the soil. Traditionally, the objective was to evenly distribute the residue behind the harvester. This objective has become more challenging given the increase in size of the header widths. Moreover, an even distribution may not be the most effective distribution for a particular field or field area, depending on a number of factors.

According to examples discussed herein, an agricultural residue distribution control system and method may be provided to improve the use of residue at an agricultural site (e.g., a field). As described below, systems and methods may particularly take a proactive approach for managing and benefiting from the spread of crop residue. Effective residue management involves consideration of a number of factors regarding an "initial state" of a field location, which may include information associated with the amount or nature of biomass in the field location. The information regarding the biomass may include residue information (e.g., residue type, constituents, and other residue information discussed below), as well as information regarding standing crop, and other biomass left on or in the soil. The initial state at a field location may further include information regarding the soil characteristics and the environmental conditions at the field location; the timing of residue management operations; and the like. Such initial state characteristics may be evaluated in view of a desired target future state of the field upon distribution of the residue. As examples, target future states may include uniform residue surface coverage at planting; distributing residue proportional (e.g., directly or inversely proportional) to the amount of biomass in the field in the current or in one or more previous agricultural state (e.g., a previous year, previous season, previous cycle, or other agricultural operation or state), a reduced amount of surface residue at planting; conversion of residue to long lasting soil carbon forms; immobilized nitrogen potentially impacting fertilizer application rates in the following growing season or other future operations; and other purposes.

In particular, an agricultural residue distribution control system and method may monitor the residue passing through the agricultural work machine as well as the environment surrounding the agricultural work machine as initial state information. The agricultural residue distribution control system and method may determine the initial state attributes or characteristics of the biomass and/or soil. As examples and without limitation, the initial state attributes of the biomass (e.g., including residue) and/or soil may include information regarding mass, weight, volume, moisture, spatial distribution across a distribution width, residue size (length, diameter, etc.), statistical distribution of size and/or constituents, plant structure elements (stalk, leaf, cob, etc.), total carbon, carbon by type (e.g., sugars, hemicellulose, cellulose, and lignan), and amount and type of inorganic material (e.g., ash and heavy metals). Moreover, the agricultural residue distribution control system and method may receive or generate a target future state representing a desired policy or outcome of the distribution; and subsequently, generate a distribution plan based on the constituent attributes of the residue and the target future state. In some examples, the agricultural residue distribution system and method may implement the distribution plan with one or more residue subsystem actuators (e.g., fans, vanes, and other steering devices) to ensure that the crop residue is properly distributed on the ground behind the agricultural harvester. Aspects to consider for managing residue may include one or more of the following: (1) relative decomposition rates of constituents such as lignin, hemicellulose, and cellulose. (2) prior soil or soil surface constituents; (3) residue cut length; (4) residue treatments; (5) residue mixtures; (6) tillage parameters; (7) any present biomass in the field, including prior distribution of residue, manure, fertilizer, and/or, standing crop; (8) future cover crops; and (9) future presence of livestock. As noted, residue management may be a crucial aspect of maintaining soil health and productivity, including improved soil health, improved soil moisture management, increased carbon sequestration, reduced soil erosion, improved selection of residue that can be removed from field for other purposes such as bedding and biofuel, and reduced carbon dioxide and methane emissions.

Reference is made to FIG. 1, which is a partial pictorial, partial schematic, illustration of an agricultural residue distribution control system 100 that may be implemented with a self-propelled agricultural harvester 102 that distributes a residue 108 behind the harvester 102; and in some examples, the residue distribution control system 100 may further include one or more offboard (or remote) machines 104 and/or a control center 106 associated with a field work site (e.g., an agricultural work site or harvest location). In some examples, the offboard machines 104 and/or control center 106 may be omitted.

The elements within (and/or remote from) the work site may wirelessly communicate with one another in any suitable manner, including directly (e.g., via Bluetooth®, radio frequency signals, or the like) or over network via communications interfaces discussed in greater detail below. Thus, the communication components discussed below may include a Bluetooth® transceiver, a radio transceiver, a cellular transceiver, an LTE transceiver, and/or a Wi-Fi transceiver. For example, such communications may utilize one or more of various communication techniques or mechanisms, including radio frequency, Wi-Fi, cellular, telematics, and/or any other suitable platforms.

In the illustrated example, the harvester 102 is a combine harvester. Although combine harvesters are provided as examples throughout the present disclosure, it will be appreciated that the present description is also applicable to other types of harvesters, such as cotton harvesters, sugarcane harvesters, self-propelled forage harvesters, windrowers, or other agricultural work machines. In addition to harvesters, the present disclosure is intended to encompass the various types of agricultural machines in which the residue distribution control system 100 be applicable, such as manure spreaders, fertilizer applicators, seeders, and sprayers. Additional details about the harvester 102 will be discussed below after a brief introduction of the offboard machine 104 and the control center 106.

Briefly, the harvester 102 may interact with an offboard machine 104 and a control center 106. The offboard machine 104 may be any type of cooperating agricultural machine, including data collection devices, such as satellites or drones, as well as other agricultural machines, such as other harvesters, manure spreaders, fertilizer applicators, seeders, sprayers, and other residue processing machines. As described below, the offboard machine 104 may include various types of sensors to collect information about the environment, crop, and/or residue; and the offboard machine 104 may further include one or more actuators to process the residue and/or other aspects of the environment. For example, the offboard machine 104 may function to process the residue 108 after it has been discharged from harvester 102. Generally, the offboard machine 104 may be terrestrial, aquatic, or aerial and may operate on a manned, semi-autonomous, or autonomous basis. As examples, the sensors of the offboard machine 104 may include without limitation cameras, stereo cameras, lidar, terahertz sensors, infrared sensors, microwave sensors, or other type of sensor.

Generally, the control center 106 may operate as a "back-end" system or server that facilitates harvesting and/or residue distribution operations. As described below, the control center 106 may interact with the harvester 102 and/or offboard machine 104 to provide data in support the residue distribution control system 100.

Prior to describing how the harvester 102 implements aspects of residue distribution control system 100, a brief description of some of the items on the harvester 102 with be provided. As shown in FIG. 1, the harvester 102 includes a frame 110 that supports the various components and elements discussed herein, including an operator compartment 112, which may have a variety of different operator interface mechanisms, for controlling and/or otherwise interfacing with the harvester 102, particularly aspects of the residue distribution control system 100. In some examples, the harvester 102 may include one or more machine display interfaces (or other types of human-machine interfaces) 114 arranged within the operator compartment 112.

Generally, the display interface 114 enables an operator to interface with the various aspects of the residue distribution control system 100 (e.g., one or more of other systems and components of the harvester 102, the offboard machine 104, and/or the control center 106). In one example, the display interface 114 includes at least an input device and a display, either as separate devices or combined. The input device of the display interface 114 is any device capable of receiving user input, including, but not limited to, a keyboard, a microphone, a touchscreen layer associated with the display, or other device to receive data and/or commands from the user. The display of the display interface 114 may include any technology for displaying information, including, but not limited to, a liquid crystal display (LCD), light emitting diode (LED), organic light emitting diode (OLED), plasma, or a cathode ray tube (CRT). In some embodiments, the display interface 114 may include output devices in addition to the display, including speakers and haptic actuators.

In one example, the residue distribution control system 100 and/or harvester may include a controller 116 that implements the various functions discussed herein. The controller 116 may be considered a vehicle controller and/or a dedicated system controller or sub-controller and/or distributed at least partially offboard the harvester 102 (e.g., including at least partially at the control center 106 and/or the offboard machine 104). In one example, the controller 116 may be implemented with processing architecture such as a processor and memory. For example, the processor may implement the functions described herein based on programs, instructions, and data stored in memory.

As such, the controller 116 may be configured as one or more computing devices with associated processor devices and memory architectures, as a hard-wired computing circuit (or circuits), as a programmable circuit, as a hydraulic, electrical or electro-hydraulic controller, or otherwise. The controller 116 may be configured to execute various computational and control functionality with respect to the harvester 102 (or other machinery). In some embodiments, the controller 116 may be configured to receive input signals in various formats (e.g., as hydraulic signals, voltage signals, current signals, and so on), and to output command signals in various formats (e.g., as hydraulic signals, voltage signals, current signals, mechanical movements, and so on). For example, the controller 116 may be in electronic or hydraulic communication with various actuators, sensors, and other devices within (or outside of) the harvester 102, including any devices described below. Although not shown or described in detail herein, the harvester 102 may include any number of additional or alternative systems, subsystems, and elements. Operation of the controller 116 within the context of the agricultural residue distribution control system 100 is discussed in greater detail below.

In one example, the harvester 102 also includes a propulsion subsystem 168 with an engine 170 that drives ground engaging components 172, such as wheels or tracks.

In operation and by way of overview, the harvester 102 includes front-end equipment that functions to engage, gather, and sever the crop, The front-end equipment includes a header 120 which in some instances includes associated reel 176 mounted on a harvester frame 110 and driven and/or adjusted by one or more actuators 134. In some instances, the front-end equipment further includes a cutter for cutting the crops. Subsequently, the severed crop material is processed by a material handling subsystem 130 with a feeder house 124 that conveys towards a feed accelerator 126, which in turn accelerates the crop material into a thresher 128. The crop material is threshed by threshing rotor 136 rotating the crop against concaves 138. Grain (or other aspect of the crop to be retained) is separated from the remaining material (e.g., as residue) by separator 140. Upon separation the residue is moved by discharge beater 150 toward the residue subsystem 162, as discussed in greater detail below. In some instances, the header may comprise without limitation other components such as row units and drapers.

The harvester 102 also includes a cleaning subsystem or cleaning shoe (collectively referred to as cleaning subsystem 142) that includes a cleaning fan 144, chaffer 146, and sieve 148. The material handling subsystem 130 also includes tailings elevator 152, clean grain elevator 154, unloading auger 156, and spout 158 to further separate grain from the residue, which is directed to the residue subsystem 162. The chaffer 146 separates some larger pieces of material from the grain, and sieve 148 separates some of finer pieces of material from the clean grain. Clean grain falls to an auger that moves the grain to an inlet end of clean grain elevator 154, and the clean grain elevator 154 moves the clean grain upwards, depositing the clean grain in clean grain tank 160. The cleaning fan 144 directs air along an airflow path upwardly through the sieves 148 and chaffers 146 to carry residue rearwardly in the harvester 102 toward the residue subsystem 162. The clean grain elevator 154 moves clean grain into clean grain tank 160.

As noted, the residue subsystem 162 functions to process the residue separated from the grain. The residue subsystem 162 may include any number of mechanisms for processing the residue, including various types of actuators that control the residue distribution characteristics (e.g., width, relative amount, etc.) of the residue leaving the back of the harvester 102 as distributed residue 108.

As examples, the residue subsystem 162 may include a residue chopper 164 that chops the residue and a spreader 166 that facilitates distribution of the processed residue. The spreader 166 may be a powered or non-powered spreading device, such as spinning discs with paddles or vanes driven by motors, or it may include stationary paddles, vanes, or shrouds that steer the residue laterally, from side to side. Regardless, the spreader 166 is configured to distribute the crop residue 108 into a desired pattern behind the agricultural harvesting vehicle 102.

As further depicted, the residue subsystem 162 may include an actuator in the form of an inoculator 178 to disperse an inoculant onto the residue with chemicals and/or biologicals, such as including enzymes, bacteria, spores, or the like to manage the decomposition of the residue. In particular, the inoculator 178 and/or other actuators may function to process the residue such that the residue decays at a reduced rate or at an accelerated rate. In some examples, smaller sizes that decay faster may be balanced against larger sizes to spread more uniformly or remain in place on the ground for a longer period of time. Further examples of actuators and other mechanisms of the residue subsystem 162 may include diverter fins, differential rotary distributors, fans, mixers (e.g., to mix residue streams or materials for desired characteristics), cutters (e.g., for cutting residue to desired length, as well as scoring or crimping), and/or residue distributors. In other examples, the residue subsystem 162 may include weed seed eliminators (not shown) such as seed baggers or other seed collectors, or seed crushers or other seed destroyers.

The harvester 102 may further include one or more sensors 190*a*-190*h* that facilitate operation of the harvester 102 and/or the harvesting functions carried out by the harvester 102, particularly the residue distribution control system 100 as described below. In the depicted example, the sensors 190*a*-190*h* (generally, sensors 190) may include a location sensor 190*a*, a ground speed sensor 190*b*, a forward-looking sensor 190*c*, a material flow sensor 190*d*, a residue attribute sensor 190*e*, a rear-looking residue sensor 190*f*, an a soil sensor 190*g*, and an environmental sensor 190*h*, each of which may be coupled to provide information to the controller 116. Generally, the sensors 190*a*-190*h* may be onboard the harvester 102 and/or one or more of the sensors 190*a*-190*h* may be offboard the harvester 102 (e.g., on machine 104). Moreover, one or more of the sensors 190*a*-190*h* may be omitted and/or additional sensors may be provided.

The location sensor 190*a* may be considered any one or more location and/or position sensors, such as a GNSS or GPS receiver, a LORAN system, a dead reckoning system, a cellular triangulation system, inertial measurement units (IMU), or other positioning system, to enable determination the location and/or position of the harvester 102. The ground speed sensor 190*b* senses the travel speed of the harvester 102 over the ground in any suitable manner, including using aspects of the location sensor 190*a*.

The forward-looking sensor 190*c* may include any type of optical sensors (e.g., cameras), infrared sensors, and radar or LIDAR systems that may be used to capture images of the surrounding environment and selected areas of the harvester 102. In particular, the forward-looking sensor 190*c* may collect information associated with the biomass material, environment, and residue in front of the harvester 102, including information about the respective amounts, constituent, and/or other characteristics.

The material flow sensor 190*d* may include one or more sensors that function to collect data associated with material speed and quantity through the header 120 and the harvester 102 such that the mass and flow of material at a particular time and location within the harvester 102 may be determined. The material flow sensor 190*d* may include electromagnetic sensors (e.g., reflection, backscatter, transmission, other), force sensors, pressure sensors, and other sensors which are mounted inside the machine.

The residue attribute sensor 190*e* may include one or more sensors that collect information that reflect residue characteristics, particularly from residue being processed by the harvester 102. For example, the residue attribute sensor 190*e* may collect information regarding the amount or relative percentage, sizes, and statistical distributions of size and/or one or more of the constituents in the residue. In some examples, the residue attribute sensor 190*e* may include near-infrared (NIR) spectroscopy sensors (such as HarvestLab™ from Deere & Company), terahertz sensors, visible wavelength sensors, ultraviolet sensors, electromagnetic radiation sensors, and other sensing mechanisms. In one example, such a sensor 190*e* may use spectroscopy to measure the absorption, reflection, transmission, or backscatter of electromagnetic radiation when interacting with an object such as crop residue. In various examples, the residue attribute sensor 190*e* may measure moisture, lignan, hemicellulose, cellulose, pectin, ash, moisture, or other constituents. The constituent attributes that are evaluated for residue characteristics may be a function of the crop type.

In some examples, the residue attribute sensor 190*e* may use image processing operating on a 2D or 3D matrix of data received by one or more imaging sensors. Generally, the residue attribute sensor 190*e*, in cooperation with the controller 116 (as well as the offboard machine 104 and/or control center 106), may use any image processing technique, neural network analysis, or any other appropriate mechanism to identify plant components in the image. For example, in a stream of residue, a residue attribute sensor 190*e* may distinguish between husk, stalks, cobs, and leaves; and based on information about the chemical make-up of each residue constituent (e.g., amount of cellulose or lignan), the percentages or amounts of relative residue mass of each constituent and/or the chemical portions may be determined.

In further examples, the residue attribute sensor 190*e* may be considered to include infrared spectroscopy. In such examples, including those in which the residue attribute sensor 190*e* may be offboard the vehicle (e.g., on offboard machine 104), the spectroscopy may be expressed as map layers containing residue attributes (e.g., amount of cellulose, hemicellulose, or lignan) based on images using relationships such as the Cellulose Absorption Index (CAI) or Normalized Difference Lignin Index (NDLI). Additional examples of the residue constituent attributes provided by the residue attribute sensor 190*e* (as well as other sensors 190*a*-190*h*) are provided below.

In one example, the residue attribute sensor 190*e*, the location sensor 190*a*, and the controller 116 may function as a biomass detection system that provides a map of the residue being processed by the harvester 102 for real-time or subsequent implementation of the residue distribution control system 100, as discussed in greater detail below. In some examples, the residue distribution control system 100 may consider a latency or delay in the consideration or evaluation of the residue and the distribution of the residue in order to accurately reflect the residue being distributed by the harvester 102 on a geo-referenced field. A latency parameter may be a fixed time value based on engineering data or a fixed time value plus a variable amount of time that takes into account draper belt speeds and vehicle speeds in which a reference residue portion delay is measured between entry into the harvester 102 and distribution out of the harvester 102 to determine time and travel distance.

The rear-looking residue sensor 190*f* monitors the distribution of the residue 108 as it is travelling in the air or lying on the ground behind the harvester 102. As described below, such data may be georeferenced using the location sensor 190*a*, the results of which may take the form of a map or map layer such as an "as-distributed residue map."

The soil sensor 190*g* may include one or more sensors that in some instances collect data for and/or evaluate residue located on the soil surface prior to residue distribution. The soil sensor 190*g* may be located underneath and/or any suitable location on the harvester 102 and/or a separate machine (e.g., machine 104). In some instances, the soil sensor 190*g* may measure soil properties prior to residue distribution such as existing soil organic matter in whole or broken down by one or more components such as humic acid, different types of living organisms, soil moisture, soil porosity, soil pH, or soil moisture. Moreover, in some instances (e.g., corn), residue (e.g., stalks) may remain on the ground and pass under the harvester 102 rather than being collected and passed through the harvester 102. The soil sensor 190*g* may further collect information on this type of residue. As discussed below, one or maps may be created based on this data, as well as data from the other sensors 190*a*-190*h*.

One or more of the environmental sensors 190*h* may provide current information about the environment near harvester 102. Without limitation, environmental sensors 190*g* may measure weather including wind speed and wind direction, temperature, humidity, gas, rainfall, solar radiation, air quality, a priori vegetative coverage data, a priori soil carbon/organic matter data, soil type, soil pH, soil moisture, soil moisture forecast, soil temperature, soil temperature forecast, soil porosity, crop history, tillage history, soil lifeform inventory, and landscape position data indicating a direction that a terrain slope faces, as well as additional environmental data discussed below.

Generally, the residue distribution control system 100 may be considered to include the residue subsystem 162, one or more of the sensors 190*a*-190*h*, and the controller 116, as well as the control center 106 and offboard machine 104. As an overview, during operation, as the harvester 102 moves along the field processing a crop and generating residue, the sensors 190*a*-190*h* collect information about the biomass (including the residue), soil, and other aspects of the operation as "initial state" information representing information associated with the state of the field location prior to distribution of the residue by the harvester 102. As such, the controller 116 evaluates initial state information along with information from the control center 106 and/or machine 104 in order to determine the initial state characteristics for consideration during distribution of the residue by the harvester 102. The controller 116 may further determine and/or retrieve a desired target future state for the residue based on various factors, including crop, subsequent use or function of the residue or field, previous biomass distribution, environmental factors, and the like. The controller 116 may further compare the initial state characteristics (including the nature of the residue to be distributed) and the desired target future state and create a residue distribution plan such that the distribution of residue achieves the desired target future state. Further, the controller 116 may implement the residue distribution plan with the actuators of the residue subsystem 162, as well as other aspects of the harvester 102 and/or the machine 104. Additional information is provided with reference to FIG. 2.

Figure 2:
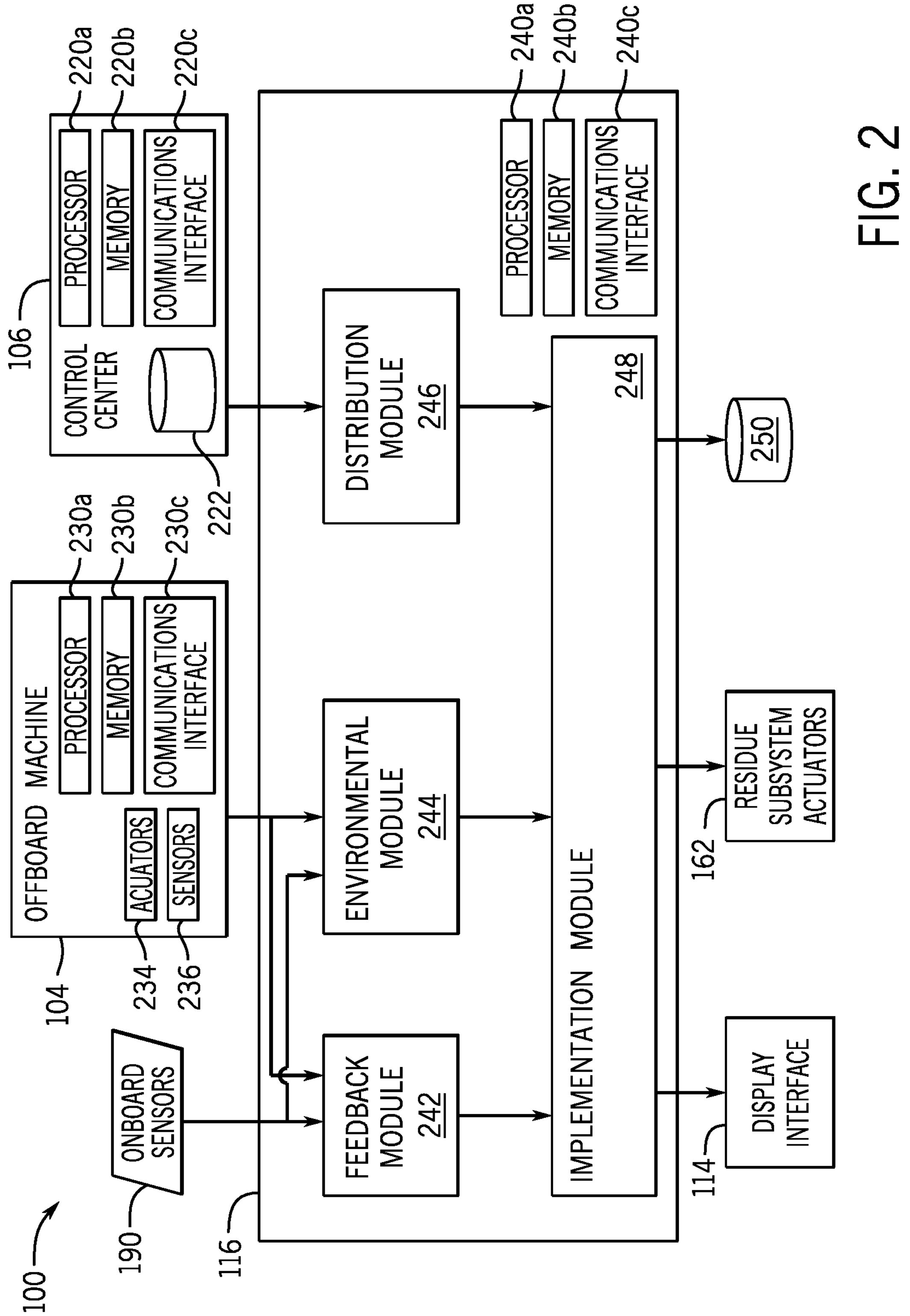
FIG. 2 is a functional block diagram representation of the residue distribution control system of FIG. 1 in accordance with an example embodiment.

Reference is made to FIG. 2, which is a more detailed, functional block diagram of the residue distribution control system 100. The configuration of FIG. 2 is just one example of the residue distribution control system 100 and example embodiments according to the disclosure herein may be provided in other configurations. As introduced above, the residue distribution control system 100 includes aspects of the offboard machine 104, the control center 106, the harvester onboard sensors 190, the harvester display interface 114, the harvester controller 116, and the residue subsystem 162, as examples.

As introduced above, the offboard machine 104 may be embodied as a machine external to the harvester 102, such as an additional crop or residue processing machine and/or a data collection machine (e.g., a drone) that may be in communication with the control center 106 and/or the harvester 102. Generally, the offboard machine 104 may include any appropriate features for carrying out designated functions, including one or more actuators 234 for processing the crop or residue and/or one or more sensors 236 (e.g., including sensors similar or identical to the sensors 190 discussed above). Generally, the offboard machine 104 may further include a processor 230*a*, memory 230*b*, and a communications interface 230*c* that couples various system components including the memory 230*b* to the processor 230*a*, as well as components outside of the offboard machine 104 (e.g., the harvester 102 and/or the control center 106). As above, the processor 230*a* may include any suitable processing component to execute instructions stored in memory 230*b*. As also discussed above, communication interface 230*c* functions to enable wireless communication, including directly (e.g., via Bluetooth®, radio frequency signals, or the like) or over a network. Thus, the communication interface 230*c* may include a Bluetooth® transceiver, a radio transceiver, a cellular transceiver, an LTE transceiver, and/or a Wi-Fi transceiver. For example, such communications may utilize one or more of various communication techniques or mechanisms, including radio frequency, Wi-Fi, cellular, telematics, and/or any other suitable platforms.

As introduced above, the control center 106 may operate as a "backend" system that may be in communication with the offboard machine 104 and/or the harvester 102 to support various aspects of the residue distribution control system 100. Generally, the control center 106 may include any appropriate features for carrying out designated functions, including a processor 220*a*, memory 220*b*, and a communications interface 220*c* that couples various system components including the memory 220*b* to the processor 220*a*, as well as components outside of the control center 106 (e.g., the harvester 102 and/or the offboard machine 104). As above, the processor 220*a* may include any suitable processing component to execute instructions stored in memory 220*b*. As also discussed above, communication interface 220*c* functions to enable wireless communication, including directly (e.g., via Bluetooth®, radio frequency signals, or the like) or over a network. Thus, the communication interface 220*c* may include a Bluetooth® transceiver, a radio transceiver, a cellular transceiver, an LTE transceiver, and/or a Wi-Fi transceiver. For example, such communications may utilize one or more of various communication techniques or mechanisms, including radio frequency, Wi-Fi, cellular, telematics, and/or any other suitable platforms.

In one example, the control center 106 may generate and/or store a target future state for the residue distribution control system 100 in a database 222. Generally, the future state is a desired operational outcome of residue distribution based on one or more policies, descriptions, or plans. For example, the target future state may correspond to a desired distribution of residue, of a residue constituent, or of a soil constituent across a field; and in other examples, the target future state may correspond to windrows or piles of residue in designed locations or a distribution of the residue directly or inversely proportional to an amount of biomass from a previous season, cycle, or operation (e.g., based on an a priori map from previous seasons, cycle or operation)s. Various factors may be considered in creating or selecting the target future state. For example, the intent of the target future state may be to facilitate conversion of the residue to long lasting soil carbon forms, to optimize the level of immobilized nitrogen, and/or to prepare the soil for a subsequent function or use within the present or in future growing seasons or states. In other examples, the target future state may be generated and/or stored on the harvester 102 and/or the offboard machine 104.

In a further example, the control center 106 may generate and/or store residue maps for the residue distribution control system 100 in the database 222. The residue maps may include residue information for particular areas of terrain, including the subject field during operation of the harvester 102. In one example, the residue maps may be generated and/or stored during previous iteration of the residue distribution control system 100. In some examples, the control center 106 may store residue maps, including a priori residue maps, empirical residue maps based on previous observations and crop models based on previous observations. As noted below, in addition to the a priori data provided by the control center 106 and/or stored by the harvester 102, the residue distribution control system 100 may also use in situ data collected by the harvester 102 in the field.

In the depicted example, implementation of the residue distribution control system 100 with the controller 116 may be considered to be organized as one or more functional units or modules 242, 244, 246, 248 (e.g., software, hardware, or combinations thereof). As an example, each of the modules 242, 244, 246, 248 may be implemented with processing architecture such as a processor 240*a*, memory 240*b*, and communications interface 240*c*, as generally discussed above. For example, the controller 116 may implement the modules 242, 244, 246, 248 with the processor 240*a* based on programs or instructions stored in memory 240*b*. In the depicted embodiment, the controller 116 of the residue distribution control system 100 includes a feedback module 242, an environmental module 244, a distribution module 246, and an implementation module 248. The view of FIG. 2 depicts one exemplary organization, and other embodiments may perform similar functions with alternative organization or implementation. Additional details about operation of these modules 242, 244, 246, 248 will be provided below.

As introduced above, the residue distribution control system 100 may receive data from one or more data sources. As examples, and as discussed in greater detail below, such data sources may include sensors 190, the offboard machine 104, and the control center 106, as well as user inputs and/or other systems.

As an example, the sensors 190 may provide the feedback module 242 with various information about the residue that is collected on the harvester 102. As noted above, biomass information may include residue information associated with the residue being processed by the harvester as well as additional sources of biomass in the field location, such as already distributed residue, standing crop, manure, and the like. In response, the onboard sensors 190 may provide such information to the feedback module 242. The feedback module 242 may additionally receive residue (as well as other types of biomass and/or soil) information from the offboard machine 104, including residue constituent information. The data may be for the entire width of the residue stream or segments across the width of the stream. Without limitation, the attributes may reflect residue characteristics such as mass, volume, moisture, residue size or component characteristics (e.g., length, diameter, constituent, statistical distribution of constituents, statistical distribution of sizes, etc.), plant structure element prevalence (e.g., stalk, leaf, cob, etc.), total carbon, carbon by type (e.g., sugars, hemicellulose, cellulose, lignan, etc.), and other material (e.g., ash, heavy metals, etc.).

The feedback module 242 receives and conditions the residue constituent information to generate residue characteristics and provides the residue characteristics to the implementation module 248.

The onboard sensors 190 and/or the offboard machine 104 may further provide environmental information to the environmental module 244. Although not shown, environmental information may additionally be received from the control center 106. Such data may be current or historical data. In some examples, the environmental data may be in the form of a map. Without limitation, the environmental data may include the following examples types of information: (1) weather data including wind speed and direction, temperature, humidity, day length, sun angle, sky cover, and the like, including current conditions or short- and long-term weather forecasts with temperature, precipitation, precipitation type, snow cover, and the like; (2) soil surface data including the terrain and the slope or the terrain, the landscape position data, e.g., the direction the slope is facing, soil surface temperature and forecast, soil surface moisture, soil color, and the like; (3) the amount and/or nature of existing biomass or unharvested crop, existing residue cover, existing residue constituent levels, and the like; (4) sub-surface soil data including soil type, soil pH, soil moisture, soil nutrient levels including NPK (nitrogen, phosphorus, and potassium) and micronutrients, total carbon, soil organic matter, soil carbon constituents (sugar, cellulose, hemicellulose, lignan, humic acid, etc.), soil health metrics, soil microbe population and demographic data, and soil porosity (oxygen and other gas availability); and (5) tillage data including past and planned tillage operations including date and type, and other crop history. The environmental information may be conditioned and provided to the implementation module 248. As noted above, collectively, the biomass information (including residue information) and/or soil information may be referred to as initial state information that reflects the state of the field location prior to distribution of the residue.

As introduced above, the control center 106 may provide a future state information and/or terrain maps to the distribution module 246. The distribution module 246 may receive the future state information and/or residue maps and generate a target future state for the present operation of the harvester 102 and residue distribution control system 100. The target future state is received by the implementation module 248.

As such, the implementation module 248 receives and considers the residue characteristics, the environmental information, and the target future state. In response, the implementation module 248 generates an implementation plan for achieving the target future state in view of the biomass and/or soil characteristics, environmental information, and other aspects of the initial state of the field location; and in some examples, the implementation module 248 implements such a plan via the residue subsystem actuators 162. Considering that the residue and environmental information may be geo-located, the distribution plan may also vary based on location. The implementation plan may include suggestions and other types of information provided to an operator via the display interface 114. Moreover, the implementation plan may include commands for the residue subsystem actuators 162. The implementation module 248 may further provide updated maps and/or other information to a database 250, which may be a database associated with the harvester 102 or correspond to the database 222 of the control center 106.

As an example, the soil and/or environmental information considered by the implementation module 248 may indicate that a field may include areas with higher clay content and areas with higher sand content, and the differences in soil type may impact residue decomposition and soil carbon retention. Since areas with more clay may "process" larger amounts of residue relative to the areas with more sand, the distribution plan may increase the amount of residue that is distributed on the areas with more clay and decrease the amount of residue spread on soil as the subsurface in the areas with more sand gets deeper. Such a distribution plan may further manage based on a constituent level (e.g., lignan, cellulose) and the ability of the soil to specifically process or retain those constituents. Furthermore, if the harvester and/or a later machine are applying additional chemicals (e.g., fertilizers; probiotics including bacteria or fungi; soil amendments such as polymers to enhance microbe growing conditions; or the like), the application rate as part of the distribution plan may be a function of the residue and/or other biomass distribution, constituent mass, soil type, and the like.

As noted above, the distribution plan may result in an even distribution of residue material or an uneven distribution of residue material. As a further example, the uneven distribution of residue by the harvester 102 may be intended to result in a relatively even distribution of vegetative materials on the ground (e.g., due to an initial uneven distribution of vegetative material already on the ground prior to distribution by the harvester 102); or the uneven or even distribution residue by the harvester 102 may be intended to result in a relatively uneven distribution of vegetative materials on the ground (e.g., to result in a particular purpose or function). Examples of a distribution plan may include, without limitation, a surface residue coverage (e.g., 30%) at a future point in time (e.g., in anticipation of next planting season); an incremental change in total soil organic matter or soil carbon; an incremental change in a type of soil carbon such as humic acid or a class or soil carbon forms like polysaccharides, etc., and/or a change to the bound/mineralized nitrogen curve for a future growing season or state. In some examples, the distribution plan may operate to form windrows to facilitate later material removal when constituent levels meet certain threshold(s) for animal digestion, bioenergy sourcing, or other off-field uses. In addition to a quantity or spread, the distribution plan may include variations with respect to inoculant application, crimping, mixing, residue size, and the like. The distribution plan may further include geolocations of the respective characteristics that may change over time or location, including consideration of machine latency.

In particular, there may be some time consideration with respect to the residue being processed and/or the crop and other biomass prior to processing by the harvester 102 relative to the time of distribution such that this latency may be considered in implementing the target future state. In some examples, the distribution plan may include commands for the offboard machine 104, e.g., for further or supplemental processing of the residue.

In some examples, the distribution plan may include at least one of the following: (i) a control plan based on in situ data as the harvester is traveling the field, (*ii*) the control plan based on a priori data collected prior to the harvester entering the field, (iii) the control plan comprises an a priori data component that is adjusted based on the in situ data, (iv) the in situ data is used to revise the a priori data for a remainder of a crop field, and (v) the control plan comprises plans or inputs to plans for future machinery passages comprising fertilizer application and tillage As noted above, the control center 106 and/or the sensors 190 on the harvester 102 may provide a residue map based on vegetative or other matter that passes under the harvester 102 rather than passing through the harvester 102. An example is corn, in which stalks and leaves typically pass underneath the harvester 102 without being processed. This type of data may be combined with the residue constituent attribute data originating from the residue attribute sensor 190*e* to provide a more complete picture prior to harvester residue distribution and as a result of harvester residue distribution. In other words, the residue maps may provide a baseline attribute value that is used to determine how the residue being processed by the harvester 102 should be distributed to result in the target future state.

In one example, implementation module 248 may be implemented with a neural network or other type of knowledge base. For example, the implementation module 248 may evaluate the input parameters with one or more algorithms and/or models that define relationships between two more parameters. In some examples, the implementation module 248 may be implemented using a neural network or other type of machine learning model. For example, a machine learning model may be trained with training data entries in order to output connections between the parameters.

Figure 3:
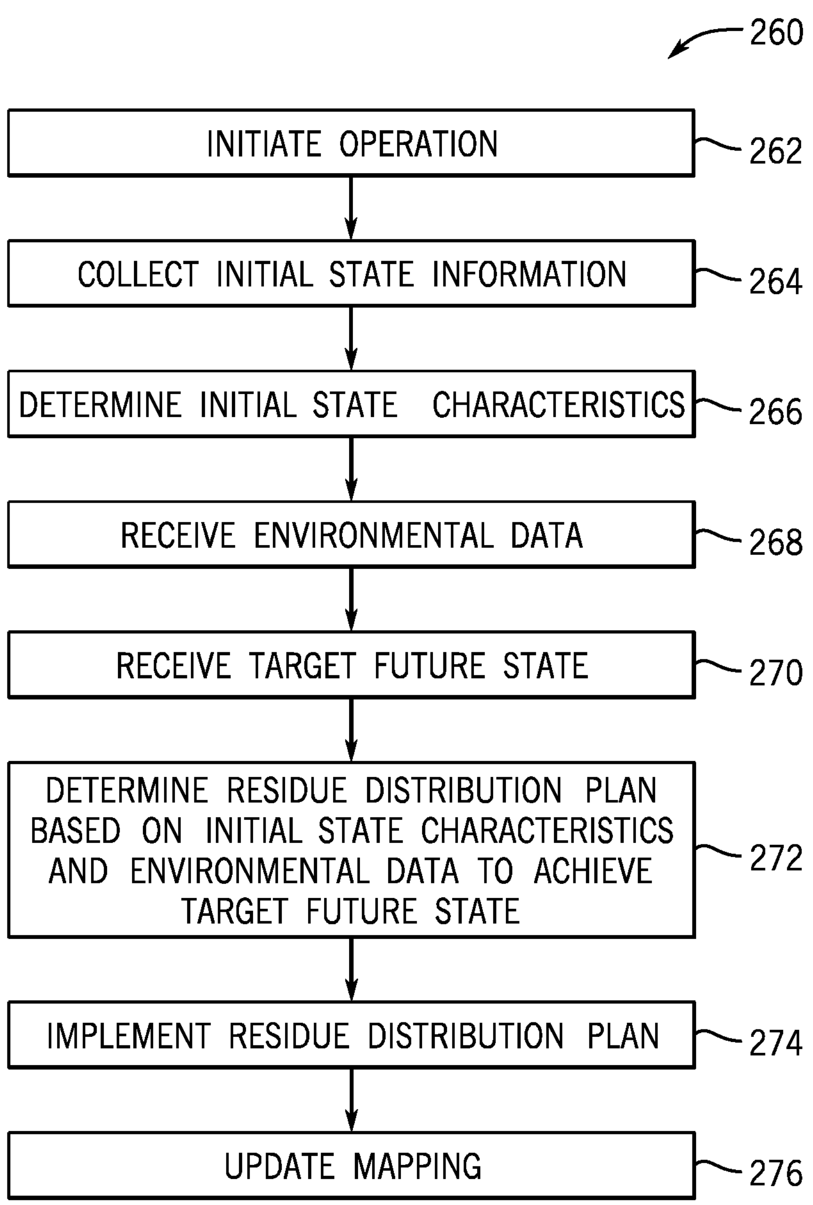
FIG. 3 is a flow chart of one implementation of a residue distribution control method in accordance with an example embodiment.

Referring now also to FIG. 3, as well with continuing reference to FIGS. 1 and 2, a flowchart illustrates a method 260 that may be performed by the agricultural residue distribution control system 100 in accordance with the present disclosure. As can be appreciated in light of the disclosure, the order of operation within the method 260 is not limited to the sequential execution as illustrated in FIG. 3, but the method 260 may be performed in one or more varying orders as applicable and in accordance with the present disclosure. Further one or more steps may be omitted and/or additional steps added.

In a first step 262, the residue distribution control system 100 may initiate operation. As noted above, the residue distribution control system 100 may operate in association with the harvester 102 during an agricultural task as the harvester 102 traverses a field processing a crop.

In a further step 264, the residue distribution control system 100 may collect information about the residue, other aspects of biomass, and/or soil information, e.g., from one or more sensors 190 that may be onboard (or in some instances, offboard) the harvester 102.

In step 266, the residue distribution control system 100 may determine initial state characteristics, particularly those associated with the constituent attributes of the residue passing through the harvester 102 and/or in the biomass and/or soil at the field location of the harvester 102.

In step 268, the residue distribution control system 100 may receive various types of environmental data regarding the environment of the harvester 102.

In step 270, the residue distribution control system 100 may receive a residue target future state representing the residue characteristics of the field upon implementation or completion of the operation. As noted above, the target future state may be received from the control center 106 and/or stored and/or generated onboard the harvester 102.

In step 272, the residue distribution control system 100 determines a residue distribution plan based on the initial state characteristics (and optionally, the environmental data) to achieve the residue target future state. In particular, the residue distribution control system 100 determines how to process and/or distribute the residue in order to result in the residue target future state.

In step 274, the residue distribution control system 100 implements the residue distribution plan. In one example, the residue distribution control system 100 may generate display commands to inform an operator of the harvester 102 about how to achieve the residue distribution plan. In a further example, the residue distribution control system 100 may generate actuator commands to the residue subsystem 162 and/or other aspects of the harvester 102 in order to autonomously or semi-autonomously implement the distribution plan.

In step 276, the residue distribution control system 100 may provide an update to a map or residue information database at the control center 106 and/or on the harvester 102 reflecting the implementation of the residue distribution plan. Upon completion of step 276, the method 260 may return to step 264 as the harvester 102 operates across a field until termination.

Accordingly, the systems and methods discussed above provide a mechanism for improving residue distribution by a harvester in a manner that provides improvements with respect to production, efficiencies, and/or soil and crop quality.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Example implementations of the disclosure may use one or more processors, including distributed computer systems and interfaces. If the implementation comprises multiple processors, they may be local or remote or a mixture; share information via wired, wireless, or a mixture of communications means; and fixedly or dynamically assign portions of computation to processors. Processors may carry out their tasks with varying degrees of human supervision or intervention. Humans may be located at any appropriate processor or communications node of the distributed system. Humans may be physically located on a work machine or at some other location. Example human interaction devices without limitation include screens, touch screens, wearable displays, audio or speech output such as ear buds or speakers, microphones, haptic output such as vibration or thermal devices, brain wave sensors, eye trackers, heart rate and other physiological sensors, or cameras for facial, gesture, or other body monitoring. In some examples, processors can include systems-on-a-chip, embedded processors, servers, quantum computers, desktop computers, tablet computers, or cell phones.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

In some embodiments, unauthorized monitoring, altering, or substitution of data communications are mitigated, e.g., by using appropriate cybersecurity mechanisms. Without limitation, example embodiments may partially or fully implement: (1) authentication of nodes sending or receiving data, (2) use of PUFs physically unclonable functions (PUFs) and/or encryption of data sent between nodes; and (3) use of a distributed, immutable ledger of data updates (e.g., Blockchain).

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An agricultural residue distribution control system associated with an agricultural work vehicle comprising:

one or more sensors configured to collect information of an initial state at a field location including an amount of biomass at the field location, soil characteristics at the field location, or both, during the initial state and to collect information associated with residue being processed by the agricultural work vehicle; and a controller having a processor and memory architecture coupled to the one or more sensors and configured to:

receive the information collected from the one or more sensors of the biomass, the soil characteristics, or both, at the field location during the initial state and the information associated with residue being processed by the agricultural work vehicle;

acquire a target future state at the field location;

generate a residue distribution plan for the target future state at the field location based on the received information collected from the one or more sensors of the amount of biomass, the soil characteristics, or both, at the field location during the initial state and the information associated with residue being processed by the agricultural work vehicle;

generating control commands based on the residue distribution plan; and controlling one or more residue actuators onboard the agricultural work vehicle with the control commands to execute the residue distribution plan to achieve the target future state.

2. The agricultural residue distribution control system of claim 1, wherein the one or more sensors are positioned on the agricultural work vehicle.

3. The agricultural residue distribution control system of claim 1, wherein the information associated with residue being processed by the agricultural work vehicle includes one or more of mass, weight, volume, size, moisture, or molecule type.

4. The agricultural residue distribution control system of claim 1, wherein the one or more sensors are further configured to collect information associated with one or more of a statistical distribution of residue size or a statistical distribution of residue constituents being processed by the agricultural work vehicle as residue information, and wherein the controller is further configured to generate the residue distribution additionally based on the residue information.

5. The agricultural residue distribution control system of claim 1, wherein the controller is configured to, prior to generating the residue distribution plan, analyze the information collected from the one or more sensors with one or more of residue image analysis, remote sensed image analysis, or residue spectroscopy analysis.

6. The agricultural residue distribution control system of claim 1, wherein the controller is configured to generate the residue distribution plan additionally based on environmental information.

7. The agricultural residue distribution control system of claim 1, wherein the controller is configured to, during the generating the residue distribution plan, account for a latency between processing of crop and distribution of the residue.

8. The agricultural residue distribution control system of claim 1, further comprising a display interface coupled to the controller, and wherein the controller is configured to display information associated with the residue distribution plan on the display interface.

9. The agricultural residue distribution control system of claim 1, wherein the one or more residue actuators include at least one of a residue mixer, a residue inoculator, a residue chopper, or a residue spreader.

10. The agricultural residue distribution control system of claim 1, wherein the target future state defines one or more of a change in total soil organic matter or soil carbon, a change in a type of soil carbon, or a change to a bound nitrogen curve for a future growing state.

11. A method for controlling residue distribution of an agricultural work vehicle, the method comprising:

collecting, with one or more sensors, information of an initial state at a field location including an amount of biomass at the field location, soil characteristics at the field location, or both, during the initial state;

collecting, with the one or more sensors, information of residue being processed by the agricultural work vehicle;

determining, with a controller, a target future state at the field location;

generating, with the controller, a residue distribution plan for the target future state at the field location based on the received information collected from the one or more sensors of the amount of biomass, the soil characteristics, or both, at the field location during the initial state and the information of residue being processed by the agricultural work vehicle;

generating, with the controller, control commands based on the residue distribution plan; and controlling, with the controller, one or more residue actuators onboard the agricultural work vehicle with the control commands to execute the residue distribution plan to achieve the target future state.

12. The method of claim 11, wherein the one or more sensors are positioned on the agricultural work vehicle.

13. The method of claim 11, wherein the information associated with residue being processed by the agricultural work vehicle includes one or more of mass, weight, volume, size, moisture, or molecule type.

14. The method of claim 13, wherein the residue information is determined with one or more of residue image analysis, remote sensed image analysis, or residue spectroscopy analysis.

15. The method of claim 11, wherein the generating the residue distribution plan includes generating the residue distribution plan additionally based on environmental information.

16. The method of claim 11, further comprising displaying, on a display interface, information associated with the residue distribution plan.

17. The method of claim 11, wherein the one or more residue actuators include at least one of a residue mixer, a residue inoculator, a residue chopper, or a residue spreader.

18. The method of claim 11, wherein the determining the residue target future state includes determining the residue target future state that defines one or more of a change in total soil organic matter or soil carbon, a change in a type of soil carbon, or a change to a bound nitrogen curve for a future growing state.

* * * * *